United States Patent
Wagner

(10) Patent No.: US 9,296,286 B1
(45) Date of Patent: Mar. 29, 2016

(54) WINDOW GASKET FOR A VEHICLE

(71) Applicant: Proterra Inc., Greenville, SC (US)

(72) Inventor: Matthew Wagner, Boiling Springs, SC (US)

(73) Assignee: PROTERRA INC., Greenville, SC (US)

(*) Notice: Subject to any disclaimer, the term of this patent is extended or adjusted under 35 U.S.C. 154(b) by 0 days.

(21) Appl. No.: 14/661,033

(22) Filed: Mar. 18, 2015

(51) Int. Cl.
*B62D 25/06* (2006.01)
*B60J 10/00* (2006.01)
*B60J 10/02* (2006.01)

(52) U.S. Cl.
CPC .............. *B60J 10/006* (2013.01); *B60J 10/02* (2013.01)

(58) Field of Classification Search
CPC .... B60J 10/0045; B60J 10/0051; B60J 10/02; B60J 10/0017; B60J 10/002; B60J 10/0022; B60J 10/0062; B60J 10/025; B62D 25/06; B62D 25/04; B62D 25/081; B62D 25/088; B62D 25/14; B62D 27/04; B62D 33/06; B62D 65/06; B62D 65/14
USPC .............. 296/93, 146.15, 208; 52/204.597, 52/716.5; 49/475.1, 490.1, 495.1, 380, 49/502
See application file for complete search history.

(56) References Cited

U.S. PATENT DOCUMENTS

| | | | |
|---|---|---|---|
| 4,582,451 A * | 4/1986 | Hollander, Jr. | 405/105 |
| 5,344,205 A | 9/1994 | Yada | |
| 6,227,598 B1 * | 5/2001 | Ichioka et al. | 296/93 |
| 6,409,244 B1 * | 6/2002 | Nagahashi et al. | 296/93 |
| 6,814,385 B2 * | 11/2004 | Fujiwara | 296/93 |
| 7,210,729 B2 | 5/2007 | Hammaker et al. | |
| 7,254,927 B1 * | 8/2007 | Farrar et al. | 52/741.3 |
| 7,703,830 B2 * | 4/2010 | Earl et al. | 296/84.1 |

* cited by examiner

*Primary Examiner* — Glenn Dayoan
*Assistant Examiner* — Sunsurraye Westbrook
(74) *Attorney, Agent, or Firm* — Bookoff McAndrews, PLLC

(57) ABSTRACT

A gasket for placement between a glass pane and a vehicle body may include a glass pane-receiving channel and a body-receiving channel. The glass pane-receiving channel and the body-receiving channel may be formed on opposite sides of a gasket body. The gasket may also include a plurality of bulb seals defined in the gasket body. The plurality of bulb seals may include a first bulb seal and a second bulb seal positioned in the glass pane-receiving channel, and a third bulb seal and a fourth bulb seal positioned in the body-receiving channel.

20 Claims, 3 Drawing Sheets

WINDOW GASKET FOR A VEHICLE

TECHNICAL FIELD

The current disclosure relates to a window gasket. In particular, the current disclosure relates to a windshield gasket for use in a vehicle.

BACKGROUND

In a vehicle, a window gasket is positioned around the perimeter of the window glass to seal the space between the glass and the opening in the vehicle body that the glass fits into. Typically, a gasket is directly attached to the glass and/or the vehicle body or is locked in place using a lock ring. The gasket prevents air and water from entering the vehicle compartment through the space between the glass and the opening. Since the gasket may be visible from outside the vehicle, the installed gasket must also be aesthetically pleasant.

Many designs of gaskets have been used to attach windows in vehicles. Many of these gaskets have opposing rectangular shaped channels for the glass and the vehicle body to sit in, and rely on the pressure of a lock ring to seal it. This configuration may work when the mating surfaces of the glass and the body are both flat. However, when such gaskets are used between a curved window (e.g., windshield) and a curved vehicle body, the mismatch between the two profiles creates gaps in the gasket seal and allows air and/or water to leak in. One common way to prevent such leaks is to apply adhesives or sealants between the body and gasket and/or the glass and gasket. However, an adhesive makes the window difficult to remove, and the sealants may not stick well to the gaskets and cause leaks. Further applying adhesives and sealants is a messy and time consuming process and may be difficult to do by untrained service technicians. The gaskets of the current disclosure may rectify at least some of the deficiencies discussed above and/or other problems in the art.

SUMMARY

Embodiments of the present disclosure relate to, among other things, window gaskets for vehicles. Each of the embodiments disclosed herein may include one or more of the features described in connection with any of the other disclosed embodiments.

In one embodiment, a gasket for placement between a glass pane and a vehicle body is disclosed. The gasket may include a glass pane-receiving channel and a body-receiving channel. The glass pane-receiving channel and the body-receiving channel may be formed on opposite sides of a gasket body. The gasket may also include a plurality of bulb seals defined in the gasket body. The plurality of bulb seals may include a first bulb seal and a second bulb seal positioned in the glass pane-receiving channel, and a third bulb seal and a fourth bulb seal positioned in the body-receiving channel.

In another embodiment, a gasket for placement between a glass pane and a vehicle body is disclosed. The gasket may include a glass pane-receiving channel including opposing side walls and a base. The glass pane-receiving channel may include at least a first pair of bulb seals. Each bulb seal of the first pair of bulb seals may be positioned on an opposite side wall of the glass pane-receiving channel. The gasket may also include a body-receiving channel including opposing side walls and a base. The body-receiving channel may include at least a second pair of bulb seals. Each bulb seal of the second pair of bulb seals may be positioned on an opposite side wall of the body-receiving channel. The gasket may also include a pair of glass pane flap seals and a pair of vehicle body flap seals. Each flap seal of the pair of glass pane flap seals may curve towards the glass pane-receiving channel, and each flap seal of the pair of vehicle body flap seals may curve towards the vehicle body-receiving channel.

In yet another embodiment, a gasket for placement between a windshield and a vehicle body is disclosed. The gasket may include a windshield-receiving channel having opposing side walls and a base and a body-receiving channel having opposing side walls and a base. The windshield-receiving channel and the body-receiving channel may be formed on opposite sides of a gasket body. The gasket may also include a plurality of bulb seals defined in the gasket body. The plurality of bulb seals may include a first bulb seal and a second bulb seal positioned on opposite side walls and a third bulb seal positioned on the base of the windshield-receiving channel. The third bulb seal may have a diameter larger than a diameter of the first and second bulb seals. The gasket may also include a fourth bulb seal and a fifth bulb seal positioned on opposite side walls of the body-receiving channel. The fourth and fifth bulb seals may have a diameter larger than a diameter of the third bulb seal.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes a gasket for a vehicle. While principles of the current disclosure are described with reference to a bus, it should be understood that the disclosure is not limited thereto. Rather, the systems and methods of the present disclosure may be used in association with any vehicle having a glass pane affixed to an opening in the vehicle body.

Figure 1:
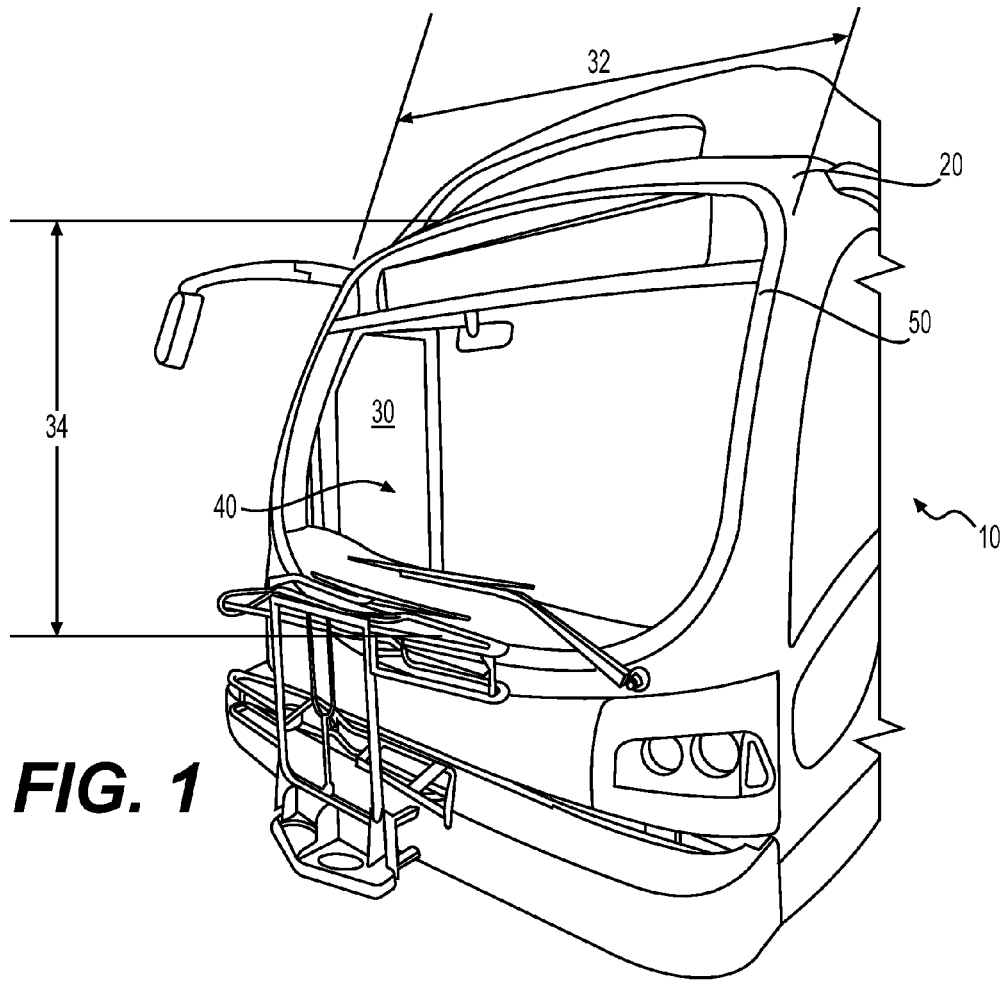
FIG. 1 is an illustration of the front of a bus.

FIG. 1 illustrates the front portion of a bus 10. In some embodiments, bus 10 may be a low-floor electric bus. As is known in the art, in a low-floor bus, there are no stairs at the front and/or the back doors of the bus. Bus 10 may include a body 20 enclosing a space for passengers and a driver. A windshield 30 may be attached to the bus body 20 to enable the driver to see in front of the bus 10. To extend driver visibility horizontally (to the sides), the windshield 30 may be a large piece of glass having a width 32 that extends substantially an entire width of the bus 10. In this disclosure, the term glass is used to refer to any transparent material (laminated safety glass, acrylic plastic, etc.) used as a window (windshield, rear/side window, etc.) in a vehicle. To extend driver visibility vertically (up and down), and allow the driver to see more of the road surface immediately in front of the bus 10, the windshield 30 may also have a height 34 that extends over a substantial portion of the height of the bus 10. In general, windshield 30 may have any width 32 and height 34. In some embodiments, the windshield 30 may have a width 32 between about 90-100 inches (229-254 cm) and a height 34 between about 60-80 inches (153-203 cm). In the current disclosure, the term about is used to indicate a variation of ±10% of a stated value.

To provide an unobstructed panoramic view out of the front of the bus, the windshield 30 may be a single sheet of glass attached to the front of the bus 10. That is, instead of multiple pieces (e.g., two) of glass attached to multiple openings on the front of the bus 10, windshield 30 may be a single piece of glass that extends over substantially the entire width 32 and height 34. Windshield 30 may be curved along one or more axes. In some embodiments, windshield 30 may be curved along multiple axis perpendicular to each other. For instance, windshield 30 may have a curvature along its width 32 and along its height 34. The curvature of the windshield 30 along its width 32 and height 34 may be the same or may be different. The curvature along different axes may also be constant or varying.

Windshield 30 may be positioned on an opening 40 on the bus body 20. The opening 40 may have substantially the same overall dimensions as windshield 30. Typically, opening 40 may be slightly larger than the windshield 30 to enable the windshield 30 to fit in the opening 40. However, this is not a requirement. In some embodiments, the body 20 in the region of opening 40 may be curved. That is, the edges of the opening 40 may have a curved profile. In some embodiments, the curvature of a region of the opening 40 may be about the same as the curvature of a corresponding region of the windshield 30. However, this is not a requirement. In some embodiments, the curvatures of mating regions of the windshield 30 and the opening 40 may be different.

A windshield gasket (gasket 50) may be positioned between the windshield 30 and the opening 40. The gasket 50 may seal any gap that may exist between the windshield 30 and the opening 40 and minimize the passage of air/water therethrough. In addition to sealing the gap between the windshield 30 and the opening 40, the gasket 50 may also form a decorative transition between the windshield 30 and the body 20. Gasket 50 may include a flexible length (or strip) of material that extends over substantially the entire perimeter of the windshield 30. The gasket 50 may provide a durable, flexible and waterproof coupling between the windshield 30 and the body 20. Gasket 50 may typically be made of elastic materials such as rubber, synthetic resin, or thermoplastic elastomer (TPE). One exemplary gasket material is ethylene propylene diene monomer (EPDM) rubber. In some embodiments, gasket 50 may include elastomers such as polyisoprene, polybutadiene, polychloroprene, butyl rubber, styrene-butydine rubber, nitrile rubber, EPM rubber, fluoroelastomer, and/or a thermoplastic vulcanizate.

Figure 2:
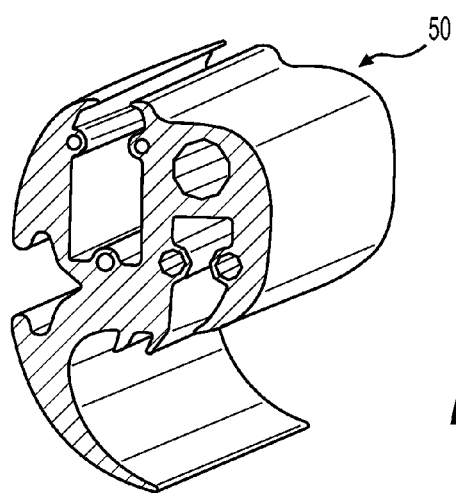
FIG. 2 is an illustration of an exemplary gasket for use in the bus of FIG. 1.

FIG. 2 illustrates a length of gasket 50 that may be used in bus 10. In some embodiments, gasket 50 may be extrusion molded into an elongated shape using well-known extrusion molding techniques to form a desired cross-sectional shape throughout its length. In some embodiments, one or more wire cores may extend longitudinally along the length of the molded structure to support and reinforce the gasket 50. In some embodiments, gasket 50 may have a substantially constant cross sectional shape over its entire length, while in others the cross-sectional shape of the gasket 50 may change according to where it is located on the periphery of the windshield 30.

Figure 3:
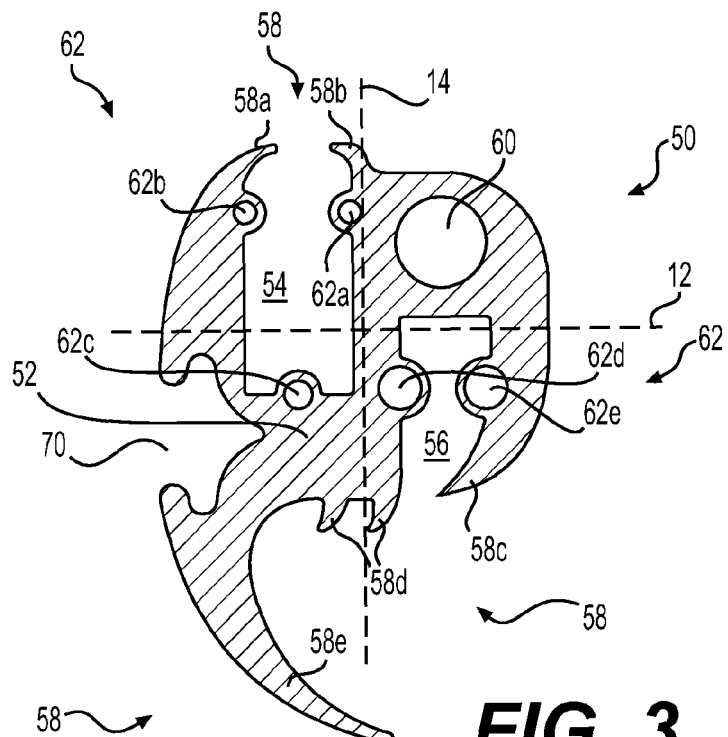
FIG. 3 is a cross-sectional view of the gasket of FIG. 2.

FIG. 3 is a cross-sectional view of gasket 50 along a plane perpendicular to its length. Gasket 50 may include a gasket body 52 defining a windshield-receiving channel 54 and a body-receiving channel 56. The windshield-receiving channel 54 is configured to receive a peripheral edge 36 of the windshield 30, and the body-receiving channel 56 is configured to receive a peripheral edge 26 of the body 20 that forms the opening 40 (see FIG. 4). The windshield-receiving channel 54 and the body-receiving channel 56 may be generally rectangular-shaped channels that open towards opposite sides of the gasket 50. In the embodiment shown in FIG. 3, the windshield-receiving channel 54 opens towards the top of the gasket 50, and the body-receiving channel 56 opens towards the bottom of the gasket 50. In some embodiments, as illustrated in FIG. 3, the windshield-receiving channel 54 and the body-receiving channel 56 may be spaced apart along a horizontal axis 12. In some embodiments, as also illustrated in FIG. 3, the base of the windshield-receiving channel 54 and the base of the body-receiving channel 56 may be spaced apart along a vertical axis 14. However, this is not a requirement, in some embodiments of gasket 50, the windshield-receiving channel 54 and the body-receiving channel 56 may be horizontally aligned (i.e., at the same location along horizontal axis 12) with their bases spaced apart along the vertical axis 14.

The gasket body 52 defining the windshield-receiving channel 54 and the body-receiving channel 56 may include a plurality of bulb seals 62. A bulb seal may be a hollow region formed proximate a surface of the gasket that forms a bulge on the surface. A pressing or a compressive force applied on this bulged region using a mating surface (e.g., a glass pane) pushes the gasket material into the hollow space. The resulting reaction force of the material that forms the bulge on the mating surface creates a tight seal between the gasket and the mating surface. The hollow region may have any shape and size. In some embodiments (as illustrated in FIG. 3), the bulb seal may have a circular cross-sectional shape. Each bulb seal 62 may be a separate hollow interior space in gasket body 52 that is compressible. The bulb seals 62 may extend over substantially the entire length of the gasket 50. The bulb seals 62 may include a first and second bulb seal 62a and 62b positioned on the side walls of the windshield-receiving channel 54 and a third bulb seal 62c positioned at the base of the windshield-receiving channel 54. The bulb seals 62 may also include a fourth and a fifth bulb seal 62d and 62e positioned on the side walls of the body-receiving channel 56. In some embodiments, bulb seals 62 may also include a bulb seal provided at the base of the body-receiving channel 56. Each bulb seal 62 may be compressed by, and form a seal with, a surface that it interfaces with.

When a peripheral edge of the windshield 30 is inserted into the windshield-receiving channel 54, a portion of the windshield 30 presses against and collapses bulb seals on the channel side wall (e.g., first and second bulb seals 62a, 62b). When the bulb seal collapses, the compressed bulb seal wall presses against, and forms a seal with, a region of the windshield 30 it contacts. As the curved wall of a bulb seal 62 expands outwards to press against the mating windshield 30, it forms a band of gasket material that is snugly pressed against the windshield 30 all the way around the edge of the windshield 30. Similarly, as the edge of the bus body 20 (the forms opening 40) enters the body-receiving channel 56, the body 20 presses against and forms a seal with the fourth and fifth bulb seals 62d and 62e. Thus, the bulb seals 62 collectively seal the windshield 30 with the body 20 and prevent (or reduce) ingress/egress of air and water. Since the flexible 50 gasket conforms to the curvature of the windshield 30 (and the body 20), the bulb seals 62 form an effective seal against the curved windshield 30. The amount of sealing provided by the bulb seals 62 may depend upon the size of the bulb seals 62 and the design and materials of gasket 50.

In addition to the bulb seals 62, gasket body 52 may also define a plurality of flap seals 58 to provide additional sealing.

A flap seal 58 may include a length of gasket material that is shaped to resiliently flex to engage with, and seal against, a mating member. The flap seals 58 may extend substantially over the entire length of gasket 50. The flap seals 58 may have a tapered shape with a greater thickness at its base (where it joins the gasket body 52) and a smaller thickness at its extreme end. The tapered shape may allow the flap seal 58 to flex resiliently. Flap seals 58 may include a pair of upper flap seals (upper outer flap seal 58a and upper inner flap seal 58b) positioned on either side of the entrance to the windshield-receiving channel 54. Each of the upper outer flap seal 58a and upper inner flap seal 58b may curve towards (and in some embodiments, enter the space of) the windshield-receiving channel 54. When the windshield 30 is inserted into the windshield-receiving channel 54, the upper flap seals may flex away from the windshield-receiving channel 54 to permit the peripheral edge 36 of the windshield 30 to enter the channel (see FIG. 4). The upper flap seals may then flex back towards the windshield-receiving channel 54 to press against, and form a seal with, the inner and outer sides of the windshield 30. In the embodiment of the gasket 50 illustrated in FIG. 3, the upper outer flap seal 58a may form a seal with the exterior side of the windshield 30, and the upper inner flap seal 58b may form a seal with the interior side of the windshield 30.

Figure 4:
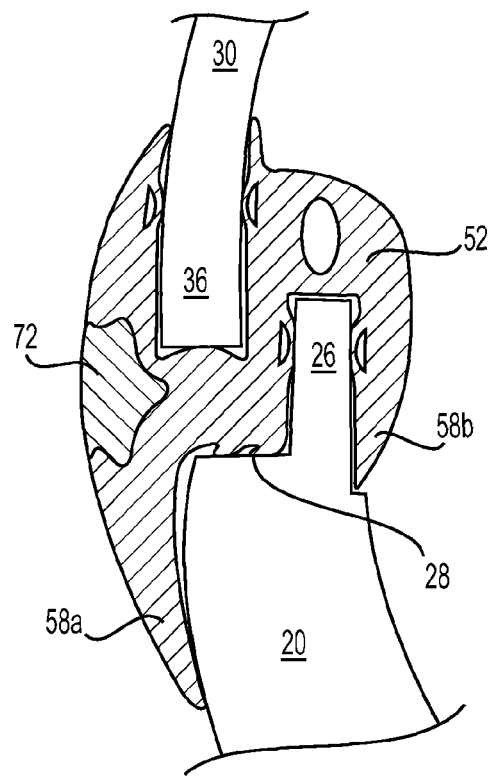
FIG. 4 is a cross-sectional view of the gasket of FIG. 2 after installation on a bus.

The flap seals 58 may also include a pair of lower flap seals (lower outer flap seal 58e and lower inner flap seal 58c) positioned on either side of the entrance to the body-receiving channel 56. The lower flap seals may be shaped, to curve towards the body-receiving channel 56, and flex away from the body-receiving channel 56 to permit the peripheral edge 26 of the body 20 to enter the channel 56. The lower flap seals may then flex back to engage with and seal against the opposite sides of the body 20. In the embodiment of the gasket 50 illustrated in FIG. 3, the lower outer flap seal 58e may form a seal with the exterior side of the bus body 20, and the lower inner flap seal 58c may form a seal with the interior side of the bus body 20. In some embodiments, as illustrated in FIG. 3, the gasket 50 may also include one or more secondary flap seals 58d positioned between the lower outer flap seal 58e and the lower inner flap seal 58c. As illustrated in FIG. 4, the secondary flap seals 58d may engage with and form a seal with a stepped region 28 of the bus body 20 formed between its inner and the outer surfaces.

The gasket 50 may also include one or more relief holes 60 for added flexibility. Relief hole 60 may be a hollow region of the gasket 50 that compresses to allow the gasket cross-section to compress in response to an applied compressive force. The relief hole 60 may extend substantially the entire length of the windshield 50. It should be noted that, although FIG. 3 illustrates a gasket 50 with one relief hole 60, this is not a limitation. In general, any number of relief holes 60 may be provided in gasket 50. These relief holes 60 may be positioned at regions of the gasket 50 that need flexibility, and their size may be determined based on the required flexibility. The gasket 50 may also include a lock ring opening 70. The shape and size of the lock ring opening 70 may be adapted to fit and securely retain a lock ring 72 therein (as described with reference to FIG. 4).

FIG. 4 shows a cross-sectional view of the gasket 50 after installation on the bus 10. In the description below, reference will be made to both FIGS. 3 and 4. In the embodiment of FIGS. 3 and 4, the peripheral edge 26 of the bus body 20 that is positioned within the body-receiving channel 56 is a region that is spaced inwards (i.e., spaced apart along horizontal axis 12) from the peripheral edge 36 of the windshield 30 positioned in the windshield-receiving channel 54. It is also contemplated that in some embodiments, the peripheral edge 26 of the body 20 may be spaced outwards (i.e., outwards as compared to the bus interior) from the peripheral edge 36 of the windshield 30. In such embodiments, the body-receiving channel 56 of gasket 50 may be positioned outwards of the windshield-receiving channel 54. In some embodiments, the peripheral edge 26 of the body 20 and the peripheral edge 36 of the windshield 30 may be horizontally aligned (i.e., at the same location along horizontal axis 12). In such embodiments, the body-receiving channel 56 and the windshield-receiving channel 54 may also be horizontally aligned.

As illustrated in FIG. 4, the peripheral edge 36 of the windshield 30 within the windshield-receiving channel 54 forms a seal with the first and second bulb seals 62a and 62b on opposite sides of the windshield 30 and another seal with the windshield 30 at its base. The upper outer flap seal 58a and upper inner flap seal 58b of the gasket 50 also makes a seal with the opposite sides of the windshield 30. Similarly, the peripheral edge 26 of the bus body 20 within the body-receiving channel 56 forms a seal with the gasket 50 at the fourth and fifth bulb seals 62d and 62e. The gasket 50 also forms a seal with the exterior surface of the bus body 20 at the lower outer flap seal 58e, and forms a seal with the interior surface of the bus body 20 at the lower inner flap seal 58c. In the embodiment of the bus 10 illustrated herein, the region of the bus body 20 that interfaces with the windshield 30 forms the step 28. The secondary flap seals 58d may form a seal with the bus body 20 at this step 28.

After the peripheral edges 26 of the windshield 30 and the peripheral edge 36 of the bus body 20 is positioned in the windshield-receiving channel 54 and the body-receiving channel 56, respectively, a lock ring 72 is inserted in the lock ring opening 70 to secure the windshield 30 to the body 20. The lock ring 72 may be shaped to force the upper outer portion of the gasket 50 towards the windshield 30 and the lower outer portion of the gasket 50 towards bus body 20 to securely retain the windshield 30 on the body 20.

It should be noted that the number of bulb seals 62 and flap seals 58 illustrated in FIGS. 2-4 is only exemplary. In general, gaskets 50 of the current disclosure may have any number of these sealing features. For example, in some embodiments, some or all of the sidewall surfaces of the body-receiving channel 56 and the windshield-receiving channel 54 may each include a plurality (2, 3, 4, etc.) of bulb seals 62. In some embodiments, bulb seals 62 may also be provided on some or both the bases of the body-receiving channel 56 and the windshield-receiving channel 54. Similarly, in general, any number of flap seals 58 may be included in gaskets of the current disclosure. The bulb seals 62 and flap seals 58 may be of any size and shape.

Figure 5:
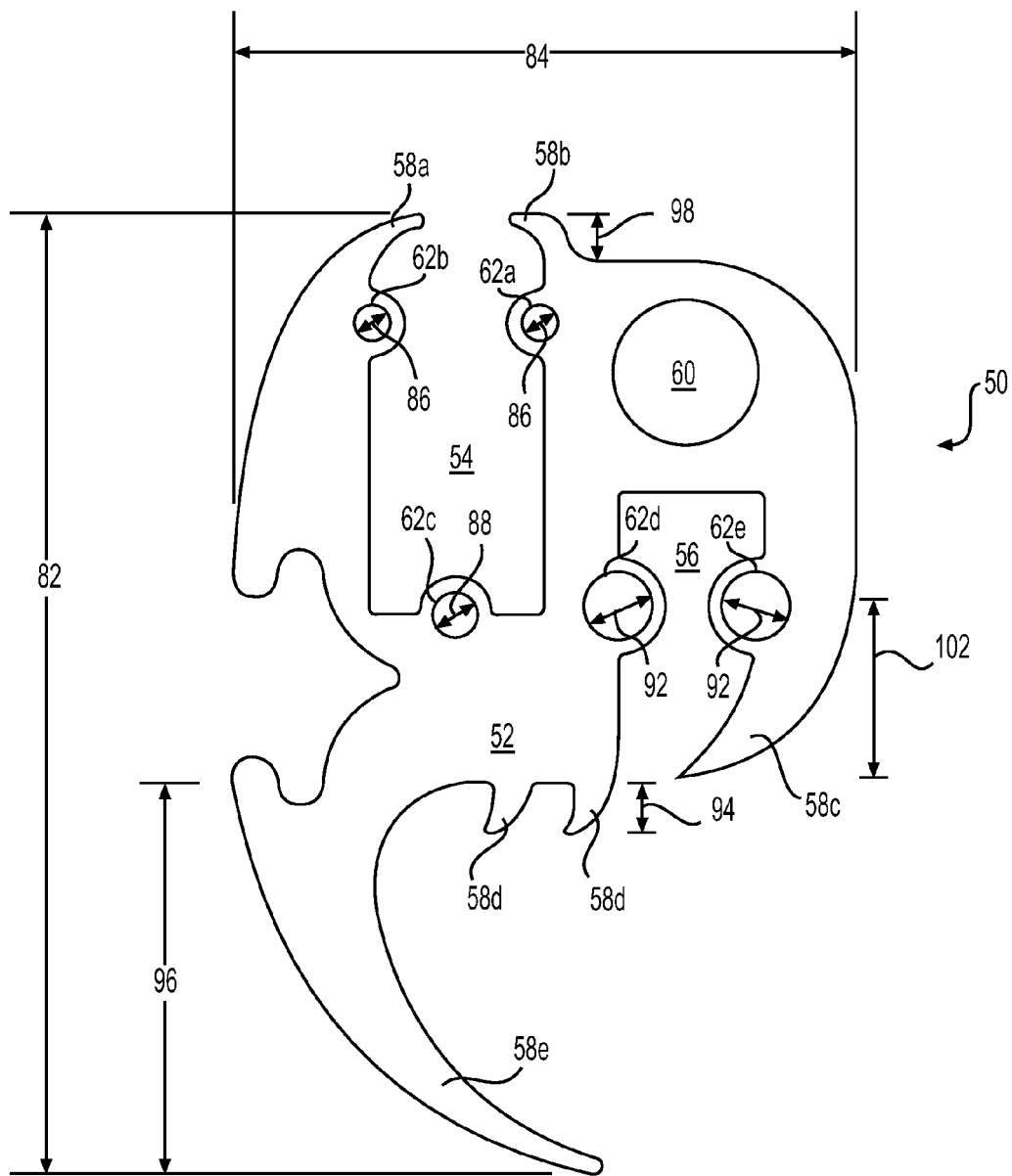
FIG. 5 is another exemplary gasket for use in the bus of FIG. 1.

Referring to FIG. 5, exemplary gasket 50 may be made of a rubber material and may have a height 82 varying between about 2-3 inches (5.1-7.6 cm) and a width 84 between about 1.5-2 inches (3.8-5 cm). The diameter 86 of the first and second bulb seals 62a, 62b may be between about 0.075-0.125 inches (0.19-0.32 cm) and the diameter 88 of the third bulb seal 62c may be between about 0.08-0.15 inches (0.2-0.38 cm). In some embodiments, the diameter 88 of the third bulb seal 62c may be larger than the diameter 86 of the first and second bulb seals 62a, 62b. In some embodiments, the diameter 92 of the fourth and fifth bulb seals 62d and 62e may be between about 0.15-0.2 inches (0.38-0.5 cm). In some embodiments, the height 98 of the upper outer flap seal 58a and the upper inner flap seal 58b may be between about 0.09-0.15 inches (0.23-0.38 cm), the height 96 of the lower outer flap seal 58e may be between about 0.8-1.3 inches (2-3.3 cm), and the height 102 of the lower inner flap seal 58c may be between about 0.3-0.7 inches (0.76-1.78 cm). In some embodiments, the secondary flap seals 58d may have a height 94 between about 0.1-0.16 inches (0.25-0.41 cm).

Any known method may be used to attach the windshield 30 to the bus body 20. In some embodiments, the gasket 50 may be first positioned around the opening 40 in the body 20 with the perimeter 26 of the body 20 inserted into the body-receiving channel 56 of gasket 50. After the gasket 50 is attached all around the opening 40, the free ends of the gasket 50 may be attached together so that the gasket 50 forms a continuous band of material around the opening 40. A windshield insertion tool may then be inserted into the lock ring opening 70, and a force applied, to pull the upper outer flap seal 58a outwards. The peripheral edge 36 of the windshield 30 may then be inserted into the windshield-receiving channel 54. The tool may then be moved to an adjacent region of the opening 40 to attach the windshield 30 in this region to the gasket 50. After thus attaching the windshield 30 to the gasket 50, the tool may be removed, and a lock ring 72 inserted into the lock ring opening 70 to fix the windshield 30 and gasket 50 to the body 20.

While principles of the present disclosure are described with reference to a gasket for the windshield of a bus, it should be understood that the disclosure is not limited thereto. Rather, the gasket described herein may be employed to sealably attach a plane of material (e.g., a pane of transparent material) to an opening in any vehicle body (for example, front/rear/side window, sunroof, etc. of car, train, bus, etc.). Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description. For example, while certain features have been described in connection with various embodiments, it is to be understood that any feature described in conjunction with any embodiment disclosed herein may be used with any other embodiment disclosed herein.

I claim:

1. A gasket for placement between a glass pane and a vehicle body, comprising:
    a glass pane-receiving channel;
    a body-receiving channel, the glass pane-receiving channel and the body-receiving channel being formed on opposite sides of a gasket body; and
    a plurality of bulb seals defined in the gasket body, the plurality of bulb seals including:
        a first bulb seal and a second bulb seal positioned in the glass pane-receiving channel; and
        a third bulb seal and a fourth bulb seal positioned in the body-receiving channel.

2. The gasket of claim 1, wherein the glass pane-receiving channel includes opposing side walls and a base, and wherein the first bulb seal and the second bulb seal are positioned on opposite side walls of the glass pane-receiving channel.

3. The gasket of claim 2, wherein the plurality of bulb seals further includes a fifth bulb seal positioned on the base of the glass pane-receiving channel.

4. The gasket of claim 1, wherein the body-receiving channel includes opposing side walls and a base, and wherein the third bulb seal and the fourth bulb seal are positioned on opposite side walls of the body-receiving channel.

5. The gasket of claim 1, further including a plurality of flap seals formed on the gasket body, wherein the plurality of flap seals include one or more glass pane flap seals extending from one side of the gasket body, and one or more vehicle body flap seals extending from an opposite side of the basket body.

6. The gasket of claim 5, wherein the one or more glass pane flap seals include a pair of glass pane flap seals, and wherein each flap seal of the pair of glass pane flap seals is formed on an opposite side of the glass pane-receiving channel.

7. The gasket of claim 5, wherein the one or more vehicle body flap seals include a pair of vehicle body flap seals, and wherein each flap seal of the pair of vehicle body flap seals is formed on an opposite side of the body-receiving channel.

8. The gasket of claim 7, wherein the one or more vehicle body flap seals further includes one or more secondary flap seals formed between the pair of vehicle body flap seals.

9. The gasket of claim 1, wherein the first and second bulb seals have a diameter between about 0.075-0.125 inches (0.19-0.32 cm).

10. The gasket of claim 9, wherein the plurality of bulb seals further includes a fifth bulb seal positioned in the glass pane-receiving channel between the first and second bulb seals, and wherein the fifth bulb seal has a diameter between about 0.08-0.15 inches (0.2-0.38 cm).

11. The gasket of claim 9, wherein the third and fourth bulb seals have a diameter between about 0.15-0.2 inches (0.38-0.5 cm).

12. A gasket for placement between a glass pane and a vehicle body, comprising:
    a glass pane-receiving channel including opposing side walls and a base, the glass pane-receiving channel including at least a first pair of bulb seals, wherein each bulb seal of the first pair of bulb seals is positioned on an opposite side wall of the glass pane-receiving channel;
    a body-receiving channel including opposing side walls and a base, the body-receiving channel including at least a second pair of bulb seals, wherein each bulb seal of the second pair of bulb seals is positioned on an opposite side wall of the body-receiving channel;
    a pair of glass pane flap seals, wherein each flap seal of the pair of glass pane flap seals curves towards the glass pane-receiving channel; and
    a pair of vehicle body flap seals, wherein each flap seal of the pair of vehicle body flap seals curves towards the vehicle body-receiving channel.

13. The gasket of claim 12, wherein the glass pane-receiving channel further includes an additional bulb seal formed on the base of the glass pane-receiving channel.

14. The gasket of claim 13, wherein the first pair of bulb seals have a diameter between about 0.075-0.125 inches (0.19-0.32 cm), the second pair of bulb seals have a diameter between about 0.15-0.2 inches (0.38-0.5 cm), and the additional bulb seal has a diameter between about 0.08-0.15 inches (0.2-0.38 cm).

15. The gasket of claim 12, wherein each glass pane flap seal of the pair of glass pane flap seals is positioned on an opposite side of the glass pane-receiving channel.

16. The gasket of claim 12, wherein each vehicle body flap seal of the pair of vehicle body flap seals is positioned on an opposite side of the body-receiving channel.

17. The gasket of claim 12, wherein the glass pane-receiving channel and the body-receiving channel are channels defined on opposite sides of a gasket body, and the first and second pair of bulb seals are enclosed hollow spaces formed in the gasket body.

18. A gasket for placement between a windshield and a vehicle body, comprising:
    a windshield-receiving channel having opposing side walls and a base;

a body-receiving channel having opposing side walls and a base, the windshield-receiving channel and the body-receiving channel being formed on opposite sides of a gasket body; and a plurality of bulb seals defined in the gasket body, the plurality of bulb seals including:
- a first bulb seal and a second bulb seal positioned on opposite side walls of the windshield-receiving channel;
- a third bulb seal positioned on the base of the windshield-receiving channel, wherein the third bulb seal has a diameter larger than the first and second bulb seals; and
- a fourth bulb seal and a fifth bulb seal positioned on opposite side walls of the body-receiving channel, wherein the fourth and fifth bulb seals have a diameter larger than the third bulb seal.

19. The gasket of claim 18, wherein the gasket body further defines a pair of glass pane flap seals and a pair of vehicle body flap seals, wherein
- each flap seal of the pair of glass pane flap seals is positioned on an opposite side of the windshield-receiving channel and curves towards the windshield-receiving channel, and
- each flap seal of the pair of vehicle body flap seals is positioned on an opposite side of the body-receiving channel and curves towards the body-receiving channel.

20. The gasket of claim 18, wherein the first and second bulb seals have a diameter between about 0.075-0.125 inches (0.19-0.32 cm), the third bulb seal has a diameter between about 0.08-0.15 inches (0.2-0.38 cm), and the fourth and fifth bulb seals have a diameter between about 0.15-0.2 inches (0.38-0.5 cm).

* * * * *